United States Patent
Bluemel et al.

(10) Patent No.: US 7,091,626 B2
(45) Date of Patent: Aug. 15, 2006

(54) METHOD FOR REGULATING THE GENERATOR VOLTAGE IN A MOTOR VEHICLE

(75) Inventors: Roland Bluemel, Stuttgart-Plieningen (DE); Wolfgang Dinser, Altbach (DE); Armin Kloepfer, Backnang (DE)

(73) Assignee: DaimlerChrysler AG, Stuttgart (DE)

( * ) Notice: Subject to any disclaimer, the term of this patent is extended or adjusted under 35 U.S.C. 154(b) by 109 days.

(21) Appl. No.: 10/380,997

(22) PCT Filed: Aug. 29, 2001

(86) PCT No.: PCT/EP01/09947

§ 371 (c)(1),
(2), (4) Date: Aug. 11, 2003

(87) PCT Pub. No.: WO02/25794

PCT Pub. Date: Mar. 28, 2002

(65) Prior Publication Data

US 2004/0021448 A1 Feb. 5, 2004

(30) Foreign Application Priority Data

Sep. 20, 2000 (DE) ................. 100 46 631

(51) Int. Cl.
| F02D 29/06 | (2006.01) |
| H02P 9/04 | (2006.01) |
| H02J 7/00 | (2006.01) |
| H02J 7/14 | (2006.01) |

(52) U.S. Cl. .................... 290/40 C; 320/104
(58) Field of Classification Search .............. 290/40 C; 180/65.2, 65.3, 65.4, 65.5, 65.8; 318/139; 477/5; 320/104
See application file for complete search history.

(56) References Cited

U.S. PATENT DOCUMENTS

| 4,659,977 A | | 4/1987 | Kissel et al. |
| 5,583,406 A | | 12/1996 | Mutoh et al. |
| 5,684,383 A | | 11/1997 | Tsuji et al. |
| 5,769,177 A | * | 6/1998 | Wickman .................. 180/65.3 |
| 5,820,172 A | * | 10/1998 | Brigham et al. .......... 290/40 C |
| 5,969,624 A | * | 10/1999 | Sakai et al. .............. 340/636.1 |
| 6,118,237 A | | 9/2000 | Kikuchi et al. |
| 6,166,449 A | * | 12/2000 | Takaoka et al. .......... 290/40 B |
| 6,232,744 B1 | * | 5/2001 | Kawai et al. ................ 320/132 |

(Continued)

FOREIGN PATENT DOCUMENTS

DE 43 07 907 5/1994

(Continued)

OTHER PUBLICATIONS

International Search Report.

*Primary Examiner*—Nicholas Ponomarenko
*Assistant Examiner*—Julio Cesar Gonzalez R.
(74) *Attorney, Agent, or Firm*—Crowell & Moring LLP

(57) ABSTRACT

A method for regulating a generator in a motor vehicle, in which the generator feeds a vehicle power supply system having loads and having at least one battery, with a regulator regulating the generator output voltage at the value of a nominal value voltage. In a recuperation readiness mode, the nominal value voltage is preset as a function of the driving state variables such that, during braking or when the vehicle is overrunning, electrical power is fed into the vehicle power supply system. Switching takes place between the recuperation readiness mode and a recovery mode as a function of predetermined switching conditions, with the nominal value voltage in the recovery mode being preset such that the battery is regenerated.

13 Claims, 2 Drawing Sheets

U.S. PATENT DOCUMENTS

| | | | |
|---|---|---|---|
| 6,362,536 B1* | 3/2002 | Izumiura et al. | 290/40 C |
| 6,366,059 B1* | 4/2002 | Wakashiro et al. | 322/16 |
| 6,424,053 B1* | 7/2002 | Wakashiro et al. | 290/40 C |
| 6,483,198 B1* | 11/2002 | Schmitz et al. | 290/40 C |
| 6,504,259 B1* | 1/2003 | Kuroda et al. | 290/40 C |
| 6,664,651 B1* | 12/2003 | Kotre et al. | 290/29 |
| 2002/0024221 A1* | 2/2002 | Grewe et al. | 290/40 C |
| 2002/0096886 A1* | 7/2002 | Schmitz et al. | 290/40 C |

FOREIGN PATENT DOCUMENTS

| | | | |
|---|---|---|---|
| JP | 401034138 A | * | 2/1989 |
| JP | 405003633 A | * | 1/1993 |

* cited by examiner

METHOD FOR REGULATING THE GENERATOR VOLTAGE IN A MOTOR VEHICLE

BACKGROUND OF THE INVENTION

This application claims the priority of International Application No. PCT/EP01/09947, filed Aug. 29, 2001, and German Patent Document No. 100 46 631.1, filed Sep. 20, 2000, the disclosures of which are both incorporated by reference herein.

The invention relates to a method for regulating the generator voltage in a motor vehicle and to a generator controller for carrying out the method.

In modern vehicles with an internal combustion engine, a generator is driven by an internal combustion engine and produces electrical power for the vehicle power supply system. In order to buffer the amount of electrical power available, the vehicle power supply system has a battery which acts as an energy store and, after being partially discharged, is recharged by means of the generator. The generator voltage governs the direction and magnitude of the charge flow at the battery, that is to say the charging and discharging cycles. The generator is normally regulated such that the voltage which is produced corresponds as closely as possible to the final charge voltage on the battery, so that the battery is always completely charged if the charge balance is positive.

A method for regulating the generator voltage in a motor vehicle as a function of operating states is known from German Patent DE 43 07 907 A1. This proposes that the generator voltage be reduced during acceleration, in order to reduce the load on the vehicle engine, and that the generator voltage be increased during braking, in order that the generator can absorb more power in order to charge the battery by recuperation of braking energy. The power flow between the battery, the generator and the loads is controlled by presetting the nominal value of the generator voltage such that it is matched to the driving state. A similar method is also known from U.S. Pat. No. 4,659,977.

Finally, U.S. Pat. No. 6,118,237 discloses a hybrid propulsion system with battery management. This battery management provides input and output power for a battery when the battery temperature is low. On detecting a low battery temperature, the state of charge of the battery is determined, and is compared with a predetermined value. This comparison result is used in order to determine whether the battery can be discharged further or whether the battery must be charged. If the state of charge is greater than or equal to the predetermined value, a control device discharges the battery to a greater extent, in order to drive an electric motor of a hybrid propulsion system in the power mode. This increased discharging causes an increase in the battery temperature, thus resulting in the input power and output power of the battery being produced once again. If, on the other hand, the state of charge is less than or equal to the predetermined value and the battery temperature of the battery is less than or equal to the predetermined temperature value, the battery is charged to an increased extent by supplying electrical power from the electric motor.

The object of the invention is to lengthen the life of the battery in motor vehicles with a recuperation mode.

The method according to the invention extends the known methods for regulating a generator by introducing an operating mode which partially reverses the consequences of stress on the battery resulting from recuperation. During recuperation of braking energy, increased stress is placed on the motor vehicle battery by the frequency changes between battery discharging and charging processes. In order to carry out regeneration of the battery regularly, a generator controller regularly switches from a recuperation readiness mode to a recovery mode, and regularly back again to the recuperation readiness mode. In the recuperation readiness mode, recuperation operation can be selected when required by presetting a suitable nominal value voltage. In the recovery mode, the nominal value voltage is preset by the generator controller such that the battery is regenerated from the increased stress on the basis of the recuperation charged changes. This method has the advantage that it prevents premature ageing of the battery.

In one advantageous development of the invention, a recuperation characteristic variable, which is a characteristic measure of the battery stress resulting from the recuperation operation, is continuously assessed as a criterion for switching to the recovery mode. This development of the method has the advantage that the battery is regenerated as required, so that a greater time is thus available for recuperation, without the life of the battery being adversely affected.

In one advantageous refinement, the charge throughput of the battery, which takes place after a specific start time, is used as a recuperation characteristic variable. One advantageous choice for the start time is, for example, the time when switching last took place from the recovery mode to the recuperation readiness mode.

A further advantageous development of the method for regulating the generator voltage proposes that, in the recuperation readiness mode, an intermediate stage, in which the loads are supplied in a mixed manner from the battery and from the generator, is provided during a change from a charging process for the battery to charge being drawn from the battery. This extension to the method has the advantage that the power losses which occur in the battery, when changing from a charging process, to a discharging process are reduced. In another advantageous development, the battery is kept in a partial state of charge in the recuperation readiness mode. In the partial state of the charge, the battery can absorb a particularly large amount of the charge which is produced by recuperation, thus receiving a particularly large proportion of the energy obtained from recuperation. This method has the advantage that it reduces the fuel consumption since the electrical power, which is required in the motor vehicle, is produced to a greater extent than before by recuperation. The disadvantage of increased stress on the battery is kept in check by controlled switching to the recovery mode.

BRIEF DESCRIPTION OF THE DRAWING

One exemplary embodiment of the invention will be described in more detail in the following text with reference to the drawing, in which.

DETAILED DESCRIPTION OF THE PREFERRED EMBODIMENT

Figure 1:
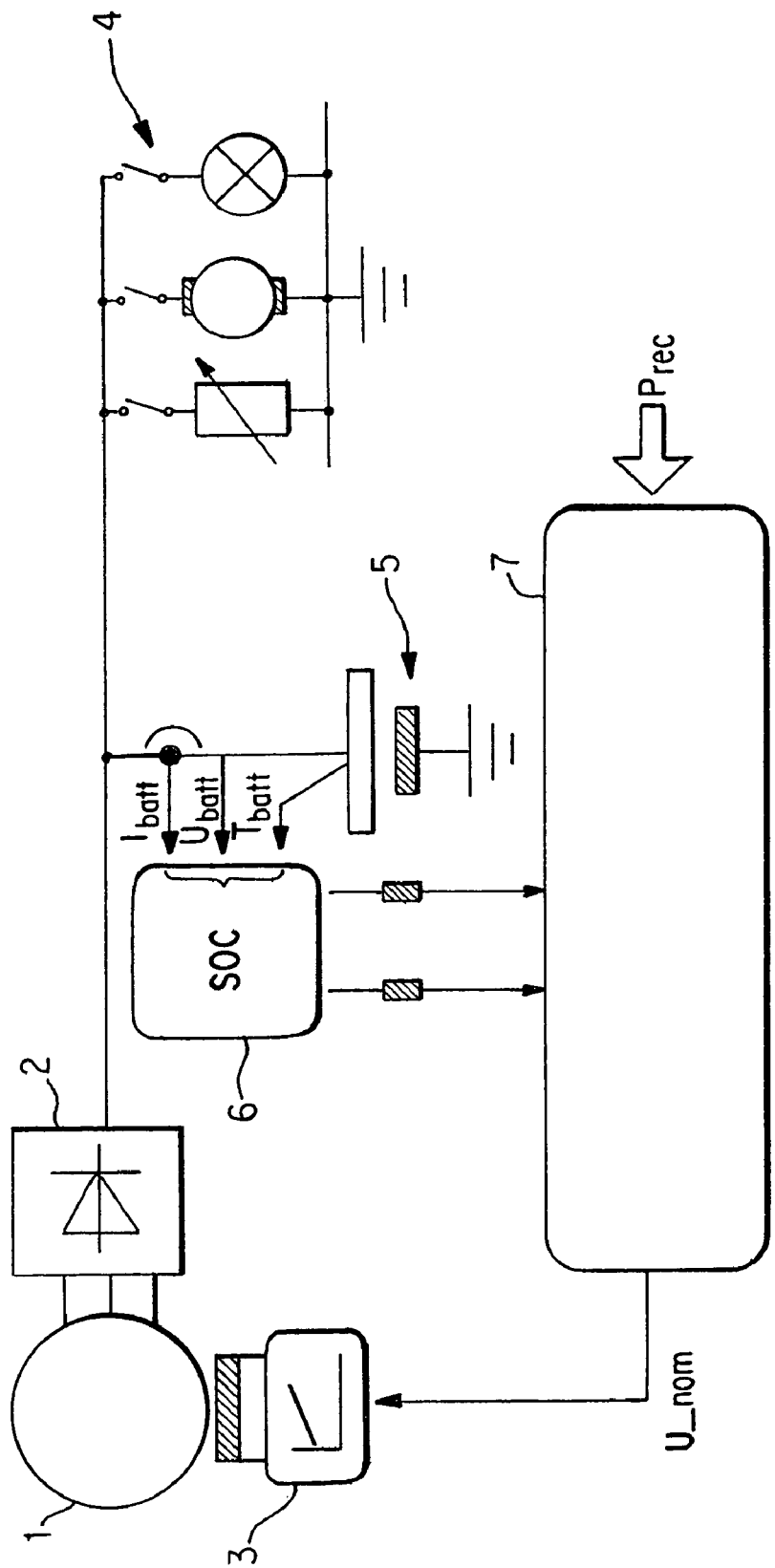
FIG. 1 shows an illustration of a recuperation vehicle power supply system having a generator controller according to the invention.

FIG. 1 shows a motor vehicle power supply system with a recuperation capability having a generator 1 which can be driven by the internal combustion engine of a motor vehicle or by a power source which can be coupled to the internal combustion engine, such as the wheels of the motor vehicle. The generator 1, together with the rectifier 2, has a regulator 3 for which the value of a nominal value voltage U_nom is preset. The output voltage at the rectifier 2 is regulated at this nominal value voltage U_nom by the regulator 3 which may be a component of the generator 1. If the output voltage at the output of the rectifier 2 is sufficiently high, electrical current is fed into the vehicle power supply system. The output of the rectifier 2 is electrically connected to the electrical loads 4 and to the battery 5, so that the current which is produced is used to supply the loads 4 directly and, furthermore, to charge the battery 5, provided that the fed current level is high enough.

The monitoring unit 6 uses, for example, the two terminal variables, battery current Ibatt and battery voltage Ubatt to determine the instantaneous state of charge SOC of the battery 5. The temperature of the battery 5 Tbatt, the internal resistance of the battery 5, the ambient temperature or other suitable parameters may additionally be used as an input variable for the monitoring unit 6 to determine the state of charge.

The vehicle power supply system also has a generator controller 7, whose task is to control the output voltage from the rectifier 2 by presetting the nominal value voltage U_nom. The magnitude of the output voltage from the rectifier 2 is the critical factor for determining whether kinetic energy is recuperated into electrical energy. If the output voltage is sufficiently high, then the battery 5 is charged while, in contrast, if the output voltage falls below a specific value, then the battery feeds power into the vehicle power supply system. In order to adversely affect the life of the battery 5 as little as possible while at the same time obtaining as much electrical energy as possible from the recuperation, the generator controller 7 is provided not only with the battery characteristic variables, such as the state of charge SOC, but also with further parameters Prec which are relevant for recuperation. These include, for example, information about overrunning with the fuel flow switched off, the vehicle speed, the outside temperature, the engine temperature, the brake pedal position, the accelerator pedal position, the instantaneous consumption, the torque on the generator shaft, the clutch position, information from the antilock braking system or from the electronic stability monitoring etc., that is to say information about the driving dynamics, the engine control, the control of the wheels and the driver's intention. The generator controller 7 uses these parameters Prec to calculate the nominal value voltage U_nom in accordance with a predetermined regulation method. One suitable regulation method is described in the following text.

A so-called basic value of the generator voltage Ubasic forms the basis for the nominal value voltage U_nom that is preset by the generator controller 7. This value corresponds to the battery no-load voltage in the partial charge range which is desired for recuperation operation. This basic generator voltage is then corrected downwards as a function of the actual state of charge SOC, of the temperature of the battery 5 Tbatt and of the accelerator pedal position. If necessary, the generator 1 will thus reduce the portion of the power that it feeds at the expense of the battery 5, in order to reduce the load on the internal combustion engine. The following expression is used, by way of example, as a simple formula for calculating the nominal value voltage U_nom for regulating the output voltage of the generator 1:

$$U\_nom = Ubasic + (SOCnom - SOCact)KA + (TREF - Tbatt)KT - (\text{accelerator pedal position})KB$$

In this case, SOCnom is the desired state of charge, SOCact is the actual state of charge, TREF is a reference temperature and Tbatt is the measured battery temperature, KA, KT and KB are correction factors for weighting of the state of charge SOC, the temperature and the accelerator pedal position.

The functions of the monitoring unit 6 and of the generator controller 7 on the basis of the description above may also be integrated in a single unit, the generator controller with the battery monitoring unit.

Figure 2:
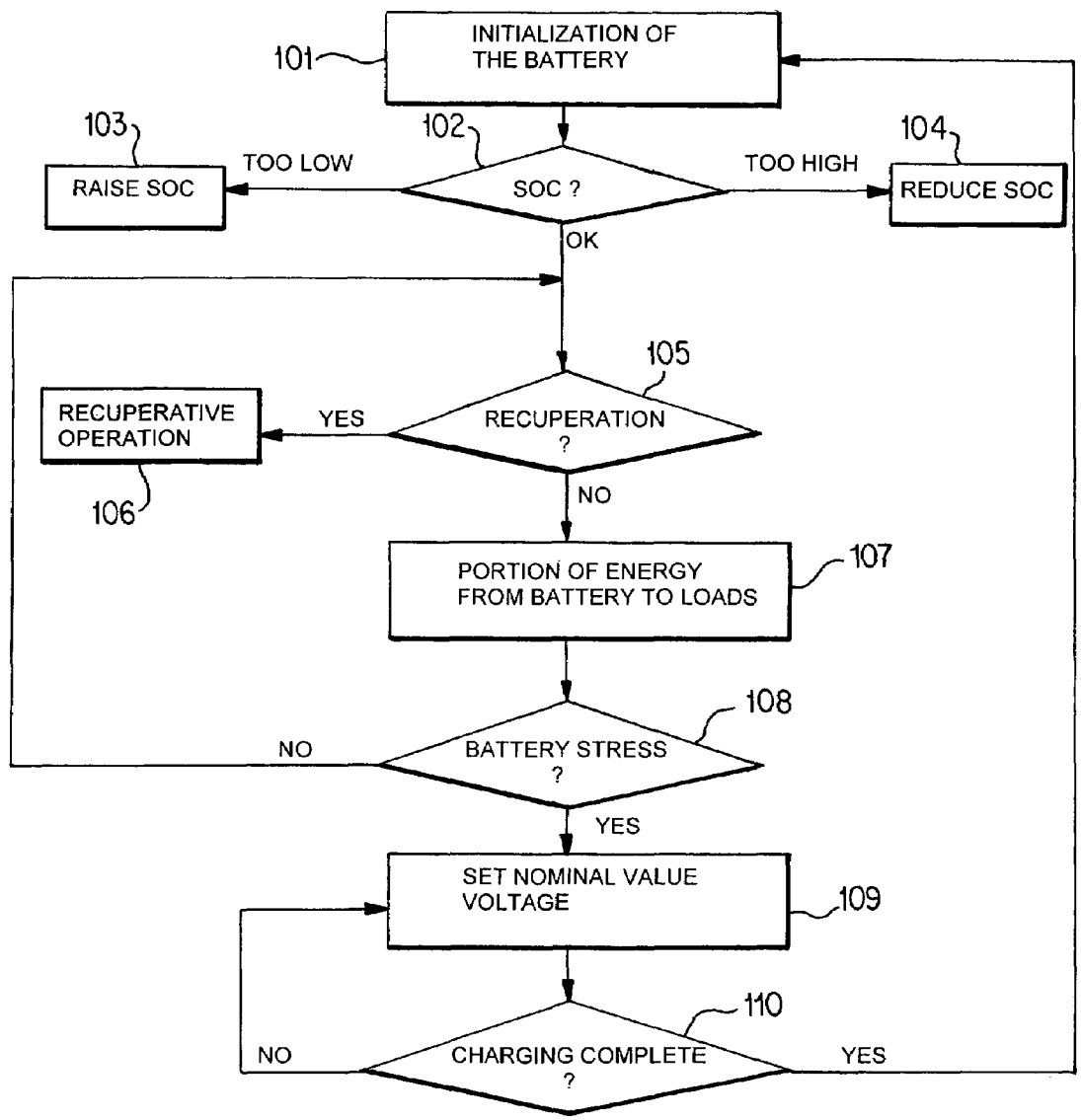
FIG. 2 shows a flowchart of the method according to the invention.

FIG. 2 shows one advantageous exemplary embodiment of a flowchart of the method according to the invention for regulating a generator 1. The battery 5 is initialized in a step 101 at the start of the method. In the process, the values of the battery characteristic variables are determined, and the state of charge SOC of the battery 5 is calculated from these values. A check is then carried out in the branch 102 to determine whether the state of charge SOC of the battery 5 is in a predetermined state of charge range. This state of charge range is defined such that the charge acceptance of the battery 5 is as high as possible, the state of the charge of the battery is likewise as high as possible, and the range is as wide as possible. Since these requirements are mutually contradictory, the definition of the state of charge range can only ever be a compromise solution. Therefore, in one advantageous embodiment, the state of charge range is adapted during vehicle operation, to be precise as a function of at least one of the following parameters: ageing state of the battery, outside temperature and distance travelled since the last starting process. In one advantageous embodiment of the invention, the predetermined state of charge range is in the partial charge range, for example between 60% and 80% of full charge, in order to obtain as high a charge acceptance as possible for the battery 5. However, the method may also be carried out in a state of charge range up to 100% charge, that is to say up to full charging of the battery 5.

If the state of charge of the battery 5 is below the predetermined state of charge range, then the state of charge is raised in step 103 until it is within the predetermined range. This is done by regulating the generator voltage at a charging level, for example at the final charge voltage. If the state of charge SOC is above the predetermined state of charge range, then the connection of the generator 1 in step 104 is dispensed with until the state of charge SOC of the battery 5 has fallen sufficiently that it is in the predetermined range.

If the answer to the question 102 is that the state of charge SOC of the battery 5 is in the predetermined state of charge range, then the process switches to the recuperation readiness mode in step 105. In this mode, the recuperation operation 106, in which kinetic energy is converted to electrical energy by the generator 1, is controlled by monitoring the recuperation conditions.

Possible recuperation conditions are overrunning with the fuel flow switched off, brake pedal operation, the power transmitted between shafts and predetermined value ranges of the speed of travel and the engine speed of revolution. In the case of automatic transmissions, a special switching-back strategy is advantageous for recuperation operation. These conditions are used to preclude specific situations, such as when the vehicle is stationary with the engine running and the footbrake is operated at the same time, when no recuperation is intended to take place.

The nominal value voltage is preset by the generator controller 7 in step 106 such that recuperation takes place for as long as the recuperation conditions are satisfied. The recuperation conditions are checked continuously (step 105) by the generator controller 7, and switching back to the recuperation readiness mode takes place when these conditions are no longer satisfied.

If no recuperation is taking place, then a portion of the stored energy is emitted from the battery 5 to the loads 4 in step 107. In order to avoid increased power losses resulting from electrochemical reactions in the battery 5, the energy is drawn in as conservational a manner as possible in an intermediate phase when changing from recuperation 106 to charge being drawn from the battery 107, that is to say the loads 4 are briefly fed in a mixed manner from the generator 1 and from the battery 5. This mixed supply results in a continuous transition between a charging process and power being drawn from the battery. Instead of the continuous transition, one or more discrete steps can also be provided for the power distribution between the generator 1 and the battery 5. During the mixed supply phase, it is advantageous to regulate the power distribution and its duration as a function of battery characteristic variables. Suitable battery characteristic values are, for example, the duration of the last charging process, the battery temperature, the power requirement from the battery 5, the state of charge SOC and the capacity of the battery 5.

In one advantageous embodiment, the recuperation process is likewise regulated in step 105 such that the battery is always in the predetermined partial state of charge, that is to say in the state of charge range with high charge acceptance.

In the question 108, which is asked regularly, one or more characteristic variables for the stress on the battery are assessed, and the process switches from the recuperation mode to the recovery mode when predetermined conditions are satisfied. Possible characteristic variables for the stress on the battery are the charge throughput, the time, the battery temperature, the difference between the battery temperature and the outside temperature, the gradient of the battery temperature, the number of braking processes, or that number times the length of the braking processes. In one advantageous embodiment, the condition for switching to the recovery mode is that at least one of the characteristic variables that are checked exceeds a specific value. The variables are determined from a specific start time, for example from the time when the process last switched to the recuperation readiness mode, and are provided for the question in step 108. The question 108 for switching to the recovery mode may be asked continuously or at predetermined intervals.

After switching to the recovery mode, the nominal value voltage is preset in step 109 such that the battery 5 regenerates, for example by holding it in the full state of charge for a specific time period. The magnitude of the nominal value voltage is regulated as a function of the battery characteristic variables and of the outside temperature, although a fixed nominal value voltage, for example the final charge voltage, may also be preset. Furthermore, in step 109, the characteristic variables for the stress on the battery are set to zero. The question 110 asks whether sufficient battery regeneration has taken place and, if the battery 5 has been sufficiently regenerated, it is reinitialized in step 101. In a simpler embodiment, a fixed time period may be preset for regeneration of the battery 5, after which the recovery mode is ended and the method continues with the renewed reinitialization in step 101.

In another embodiment, the regeneration of the battery 5 is achieved by the battery 5 being discharged down to a first state of charge SOC and then being charged to a second state of charge SOC, in which case the second state of charge SOC may, in particular, be full charge. This monitored discharging and charging of the battery 5 is carried out once or more successively. Since the battery 5 is severely discharged in this embodiment of the method, battery regeneration can in this way be carried out only in a vehicle with more than one battery 5, in order to make it possible to ensure that an electrical power supply is available all the time and that the vehicle can be started at any time.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for regulating a generator in a vehicle power supply system including a plurality of loads and at least one battery with a regulator, said method comprising:
   regulating the generator output voltage at the value of a nominal value voltage in one of a recuperation readiness mode and a recovery mode;
   setting the nominal value voltage in said recuperation readiness mode as a function of driving state variables such that, during braking or when the vehicle is overrunning, the generator and battery are operated in a recuperation operation, in which the generator converts kinetic energy of the vehicle to electric power that is fed into the vehicle power supply system and charges the battery;
   setting the nominal value voltage (U_nom) in the recovery mode such that the battery is regenerated from degradation due to stress caused by charging during a recuperation operation; and
   switching from the recuperation readiness mode to the recovery mode as a function of a characteristic variable that is indicative of a degree of cumulative battery stress resulting from charging during recuperation operation; wherein
   in said recuperation readiness mode, recuperation operation of said generator, wherein said generator is driven by vehicle kinetic energy and converts said vehicle kinetic energy to electric energy that is stored in said battery, is permitted under predefined conditions;
   in said recovery mode, recuperation operation is precluded, and said generator is controlled to charge said battery according to a predetermined charging pattern that at least partially reverses deterioration of the battery which results from stress due to recuperation operation.

2. The method according to claim 1, wherein, in the recovery mode, the nominal value voltage (U_nom) is set to a final charge voltage independently of the driving state variables.

3. The method according to claim 1, wherein, in the recovery mode, the nominal value voltage (U_nom) is regulated such that the battery is discharged at least once down to a first predetermined state of charge (SOC), and is then charged to a second predetermined state of charge (SOC).

4. The method according to claim 1, wherein the recuperation characteristic variable is the charge throughput through the battery detected after a specific start time.

5. The method according to claim 4, wherein the start time from which the charge throughput is considered is the time when switching last took place from the recovery mode to the recuperation readiness mode.

6. The method according to claim 1, wherein the battery is regulated at a predetermined partial state of charge in the recuperation readiness mode when recuperation operation is not occurring.

7. The method according to claim 1 wherein, in the recuperation readiness mode, an intermediate stage, in which the loads are supplied in a mixed manner from the battery and from the generator, is provided during a change from a charging process for the battery to charge being drawn from the battery.

8. A method of operating a vehicle electrical system that includes a generator connected to a vehicle electrical load and to a vehicle battery, said generator being driven alternatively by a vehicle propulsion device or by kinetic energy of the vehicle, said method comprising:
   operating said system in a recuperation readiness mode; and
   intermittently switching operation of said system to a recovery mode; wherein,
   in said recuperation readiness mode, recuperation operation of said generator, wherein said generator is driven by said vehicle kinetic energy and converts said vehicle kinetic energy to electric energy that is stored in said battery, is permitted under predefined conditions;
   in said recovery mode, recuperation operation is precluded, and said generator is controlled to charge said battery according to a predetermined charging pattern that at least partially reverses deterioration of the battery which results from stress due to recuperation operation;
   said step of switching operation of said system to the recovery mode is performed as a function of a characteristic variable that is indicative of a cumulative degree of battery stress resulting from past charging of said battery in said recuperation operation; and
   said predetermined charging pattern comprises at least one of i) charging said battery to a full state of charge and maintaining said full state of charge for a predetermined time period; and ii) discharging said battery to a first, severely discharged, state and thereafter charging it to a second, substantially fully charged state.

9. The method according to claim 8, wherein said predefined conditions include at least one of:
   operation of a vehicle brake pedal;
   overrunning operation of the vehicle; and
   predetermined ranges of vehicle speed and engine speed.

10. The method according to claim 8, wherein said characteristic variable is based on at least one of:
    charge throughput;
    charge time;
    battery temperature;
    ambient temperature;
    number of brake actuations; and
    duration of brake actuations.

11. The method according to claim 10, wherein charge throughput is measured beginning at a time when the system is switched from the recovery mode to the recuperation readiness mode.

12. The method according to claim 8, wherein during said recuperation readiness mode, the battery is regulated to a partial state of charge range, which is less than a full charge, when recuperation operation is not occurring.

13. The method according to claim 8, wherein, in the recuperation readiness mode, an intermediate stage, in which the loads are supplied in a mixed manner from the battery and from the generator, is provided during a change from a charging process for the battery to charge being drawn from the battery.

* * * * *